Figure 1:
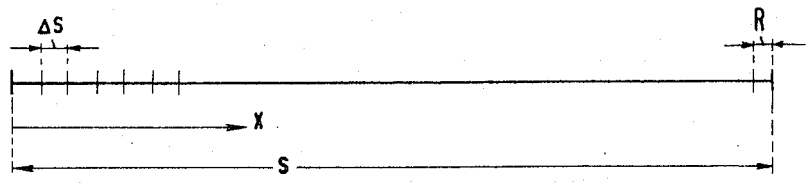

United States Patent
Schiewek et al.

[15] 3,664,217
[45] May 23, 1972

[54] METHOD AND SYSTEM FOR DIGITAL SUBDIVISION OF THE TOOL FEED TRAVEL OF A NUMERICALLY CONTROLLED MACHINE TOOL

[72] Inventors: Peter Schiewek, Eltersdorf; Dieter Kremper, Erlangen, both of Germany

[73] Assignee: Siemens Aktiengesellschaft, Berlin, Munich, Germany

[22] Filed: Feb. 24, 1970

[21] Appl. No.: 13,662

[30] Foreign Application Priority Data

Mar. 1, 1969 Germany......................P 19 10 577.2

[52] U.S. Cl..........................................83/49, 83/71, 83/72, 83/74, 83/916
[51] Int. Cl. ......................................B26d 3/00, B23d 27/00
[58] Field of Search....................83/72, 74, 71, 49, 916, 559, 83/560

[56] References Cited

UNITED STATES PATENTS 3,563,123 2/1971 Leibinger............................83/916 X
3,564,595 2/1971 De Florio et al.......................83/71 X Primary Examiner—James M. Meister
Attorney—Curt M. Avery, Arthur E. Wilfond, Herbert L. Lerner and Daniel J. Tick

[57] ABSTRACT

The tool feed travel of a numerically controlled machine tool is subdivided into steps of approximately equal lengths by sequentially adding after one of the first steps the length ($\Delta s$) of the respective next following steps to obtain each time the sum total ($n\Delta s$) of the number ($n$) of steps already performed, comparing each of the sum totals thus counted with the then still remaining feed travel ($s-x$), and shortening the length of the subsequent steps a given amount ($\nu$) until the difference between the still remaining feed travel ($s-x$) and the sum total ($n\Delta s$) declines below a given minimum ($d$) between 50 and 100 percent, preferably between 60 and 70 percent, of the normal step length. The method is performed with the aid of a logic system in which a pulse generator, preferably an interpolator, issues to a pulse counter a number of pulses during each tool-feed step, this number being indicative of the pulse length. Logic components compare the counted sum total with a number originally set to the total feed travel and progressively reduced in accordance with the feed travel already performed. When the comparison results in a difference smaller than a given minimum, the output of the logic system resets the pulse counter by a given amount which shortens the subsequent travel steps until the difference declines below the above-mentioned minimum.

3 Claims, 2 Drawing Figures

METHOD AND SYSTEM FOR DIGITAL SUBDIVISION OF THE TOOL FEED TRAVEL OF A NUMERICALLY CONTROLLED MACHINE TOOL

Our invention relates to a method and system for digitally subdividing the machining or feed travel of a numerically controlled machine tool into steps of approximately equal length. More particularly, the invention concerns itself with the digital subdivision of the feed travel in machine tools, such as nibble machines and similar stamping or punching machines, whose step length, namely the length of relative travel between tool and workpiece between successive punching operations, is largely predetermined or fixed by the machining requirements or by technological data of the machine tool itself.

When employing a numerical control in nibble machines or the like, such as those used for example in the production of switch or control panels, the travel portion to be machined along a contour is programmed into a corresponding portion of a program carrier, usually a punched tape, which controls the machine. The travel is subdivided into steps that are supposed to have the same length; and after the travel corresponding to one individual step has been completed, the punching tool is put into operation. After punching, the tool feed advances another step before the next following punching stroke is performed.

The incremental length of travels, i.e., the step length, results from the programmed travel speed of the tool and from the interval of time during which the control pulse passes from the control system to the drive of the machine tool. The pulses for controlling the machine are delivered, as a rule, from a pulse generator such as an interpolator. As a rule, an electronic limit switch controlled by a function generator is effective each time to release the interpolator or other pulse generator for pulse-issuing operation as long as the punch of the machine is in the region of its upper dead-center or limit position.

The interval of releasing time, conjointly with the programmed speed, determines the travel distance which the tool-feed drive of the machine traverses from stroke to stroke; and this travel distance constitutes an individual step length of tool feed. When operating a nibble machine under conditions involving respectively different lengths of feed travel, and providing for a constant step length, it is nearly always inevitable that a travel remainder occurs at the end of each interpolation portion. This remainder may be so small that during nibbling operation the punching tool will yield laterally back to the precedingly punched hole, thus causing tool breakage or unsatisfactory machining performance.

A similar problem of proper travel subdivision also occurs with shaping machines for which care must be taken that the last chip to be removed will not have a thickness below a given minimum.

It is an object of our invention, relating to machine tools of the above-outlined general types, to modify the step length of the machine in such a manner that the "remainder" will maintain approximately the same size as the preceding steps of the digitally subdivided feed travel.

To this end, and in accordance with our invention, we commence after one of the first few machining steps, or preferably with the very first step, to continuously add and sum-up the length of the respective steps and to compare each time the sum total with the machining travel that still remains to be traversed; and we thereafter shorten the step length of subsequent steps by a given amount until the difference between the remaining feed travel and the sum total declines below a value between 50 and 100 percent of the original or normal step length.

A control system according to the invention for performing the digital subdividing method just outlined may be so designed, for example, that a number of pulses corresponding to the particular step length just traversed is integrated in a pulse counter which operates to discontinue the feed drive of the machine tool when a predetermined number of pulses is reached. This counter is presettable and adjusted to release the discontinuing operation when the above-mentioned difference drops below the predetermined, technologically necessary or desirable value. Suitable for measuring the difference is a storer or memory in which, for example, the length of the first step is continually added, and a second storer or memory is preset in accordance with the entire feed travel, the count being progressively reduced in accordance with the machining travel already traversed. A subtracting circuit means may serve for forming the difference between the respective contents of the two storers, and an evaluating network connects the subtracting means with the pulse counter for presetting the counter a small numerical amount whenever the difference reaches or drops below 50 to 100 percent, preferably 60 to 70 percent of the original step-length.

The invention will be further described with reference to the accompanying drawing, showing by way of example In FIG. 1 an explanatory diagram relating to the subdivision of the feed travel; and In FIG. 2 a feed control system for a machine tool suitable for performing the desired subdivision.

The schematic diagram of FIG. 1 shows a travel path subdivided into steps $\Delta s$ whose length is predetermined and has a normally fixed value, although it can be varied to a slight extent. The principle of subdividing the feed of a numerically controlled machine tool is known as such, for example from a paper by Kaiwa and Inaba, published in "Control Engineering" of October 1961, pages 85 to 91.

While a straight-line travel is presumed in FIG. 1, the same method is also applicable for the machining of arcuate contours. In FIG. 1 the travel direction is denoted by the arrow X. The length of $\Delta s$ of the steps is equal from one of the first few steps or the very first step over most of the travel distance $s$, but there remains an ultimate step R which, as explained, should not be shorter than a predetermined value $d$, preferably about 60 to 70 percent of the original step length $\Delta s$.

Figure 2:
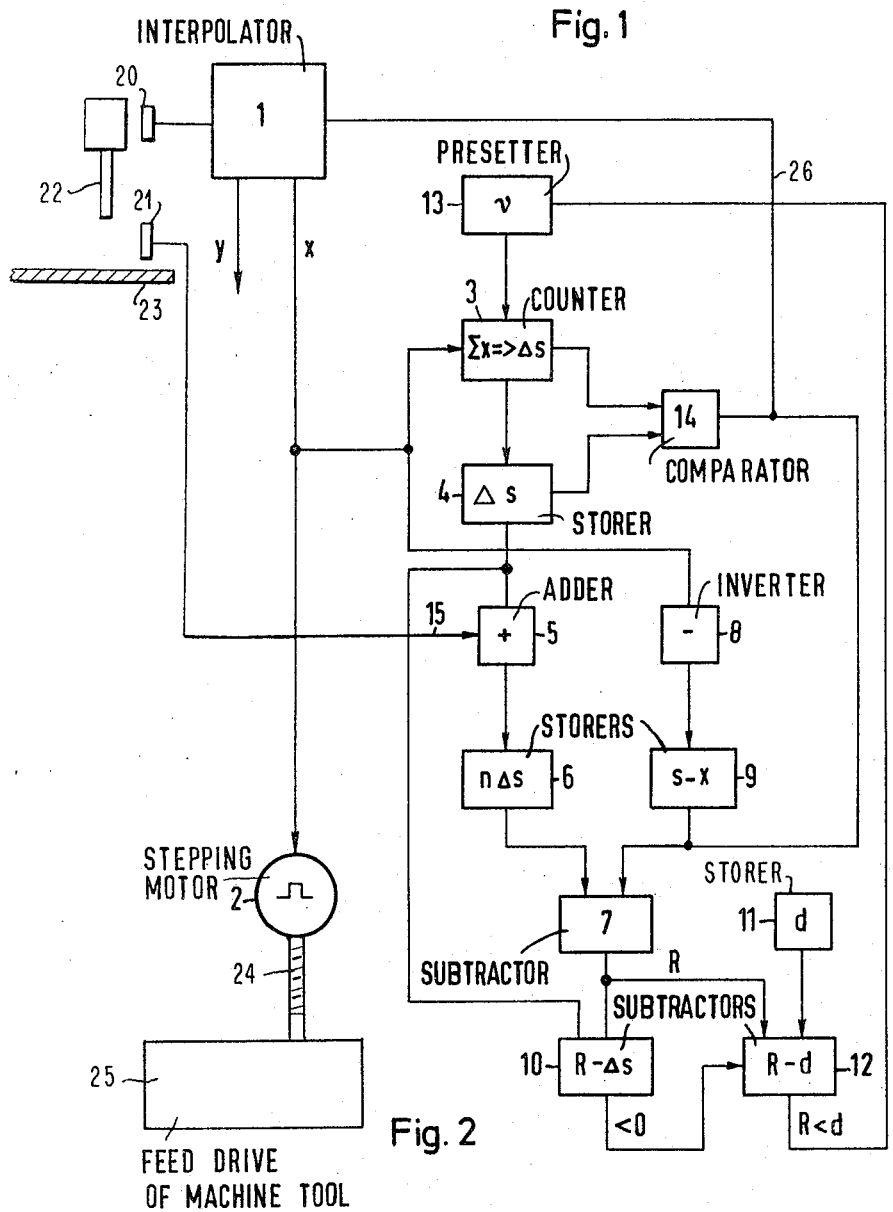

The system shown in FIG. 2 serves to vary some of the individual step lengths $\Delta s$ (stroke distances) so that the remainder R will satisfy the just-mentioned condition. The system comprises an interpolator 1 which is essentially a small computer programmed by a punch tape to compute (interpolate) the individual travel points between two widely spaced curved loci, such as the beginning and end of travel $s$, in accordance with a predetermined, for example linear, function. For each travel step the interpolator issues a train of pulses to serve as a datum reference for the tool feed travel. As long as during consecutive steps of feed travel the step length $\Delta s$ remains constant, the number $x$ of pulses in the respective pulse trains remains constant. The pulses reach an electrical stepping motor 2 to effect the feed in the X-direction. Interpolators are commercially available under the trade name INDUCTOSYN; as to details, reference may be had to U.S. Pat. No. 2,875,390 of R. W. Tripp, or to Siemens Zeitschrift, 1966, pages 61 to 66. Such devices are available for linear tool travel, as well as for curved travel. The interpolators may also be given a circular design if a circular feed travel of the tool makes this desirable. Suitable stepping motors, schematically shown at 2 in FIG. 2 of the drawing, are also known and commercially available. In this respect, reference may be had to the paper by Kaiwa and Inaba, in "Control Engineering" of January 1962, pages 73 to 75, and to the U.S. Pat. of Inaba et al., No. 3,310,284 and No. 3,079,899.

The pulses issued per step from the interpolator 1 are counted and thereby integrated in a counter 3. Also connected to the interpolator 1 is a pulse storer 9 into which the entire travel distance $s$ to be traversed is preset by adjusting the starting count of the storer 9 to the grand total of pulses that correspond to the value $s$. An inverter member 8 precedes the storer 9 in its input connection with the interpolator 1; that is, the connection between the storer 9 and the interpolator 1 is such that during each forward step $\Delta s$ in the direction X, the originally preset value of $s$ in storer 9 is reduced by the distance already traversed in the X-direction.

At the end of the first step, the result $\Delta s$ of the counter 3 is transferred into another storer 4 and the counter 3 is then cleared to again commence counting from zero during the next following feed step.

When the storer 4 receives a command through a signal line 15, the contents of the storer 4 is continually added through an adder member 5 into a storer 6 in which thus the value $n\Delta s$ is formed. This addition is repeated as long as the content memorized in storer 9 remains larger than the memorized content of the storer 6. That is, as long as $(s-x)-(n\Delta s)>0$.

As explained above, the interpolator 1 is kept released as long as the punching tool 22 is near or at its upper stroke limit. Accordingly, an upstroke limit sensor 20 is shown connected by a signal lead with the interpolator. A corresponding sensor 21 near the lower stroke limit of the tool 22 serves to issue the adding signal to line 15. That is, the adding operation is performed when the tool has completed a working stroke relative to the workpiece 23. For feed travel control, the stepping motor 2 is connected by a shaft 24 to the feed drive proper 25 of the machine tool.

The difference of the respective contents contained in the two storers 4 and 9 is formed in a subtracting member 7 which has two inputs connected with the respective outputs of the storers 6 and 9.

This difference, appearing as the output of subtractor member 7, and the content $\Delta s$ of the storer 4 are applied to the respective two inputs of a further subtractor member 10 which terminates the addition process when the difference minus the value $\Delta s$ has become smaller than zero. Assume that up to the moment when this occurs, the step length $\Delta s$ has remained the same during the entire preceding machining operation. Consequently, the difference now constitutes the remainder R. This difference is compared with a minimum stroke value $d$ which is set into a storer 11, the comparison being effected by another subtractor member 12. If the remainder R is smaller than the minimum value $d$, a command is issued by subtractor 12 to the presetter 13 which prior to the next step presets the counter 3 in accordance with the value $\nu$.

Now the next step commences. During this step, the comparator 14 issues a stop signal on output line 26 to the interpolator 1 and thereby stops the issuance of pulses from the interpolator 1 to the stepping motor 2 as soon as the value $\Delta s$ contained in the storer 4 is reached. Since the counter 3 was preset to $\nu$, the travel actually traversed with $\nu$ units shorter than the preceding stroke of the normal step length $\Delta s$.

Upon completion of this stroke, the content $\Delta s$ of storer 4 is again added into the storer 6 and the resulting sum total is compared with the value now contained in the storer 9. If the result again shows R<$d$, the above-described operation is repeated. Only when R ≥ $d$ will the next following step remain unmodified and thus retain the original, normal length $\Delta s$.

A simple numerical example may elucidate the performance: Assume that $s = 104$, $\Delta s = 10$ and $d = 6$ units, i.e., pulses. After the first step $\Delta s$, the counter 3 shows 10, and the storer 9 shows $104 - 10 = 94$. The amount 10 is now repetitively added into the storer 6 as long as the difference between the content of storer 9 and the content of storer 6 remains positive. Consequently, the remainder R = 94 −90 = 4. This remainder 4 is smaller than the minimal stroke length $d = 6$. As a result, the counter 3 is now preset, for example to the value $\nu = 1$. The next step thus amounts to $\Delta s - 1 = 10 - 1 = 9$ units. At the completion of this stroke, the count of storer 9 has reached the value $94 - 9 = 85$, and the remainder R has the value R = 85 −80 = 5. This remainder still is smaller than the minimal stroke $d$ so that prior to the next following feed stroke the counter 3 is again preset to $\nu = 1$. After the next step, the count of storer 9 has reached the value $85 - 9 = 76$, and the remainder now is R = 76 −70 = 6. This remainder is equal to the required minimal stroke $d$. Consequently, the next following steps need no longer be diminished.

It will readily be seen that the value $\nu$ need not necessarily be equal to 1. Larger permissible values can be chosen if the originally programmed feed stroke is to be reached more rapidly.

The components 3 to 14 of the logic circuit system shown in FIG. 2 may consist of commercially available logic modules such as those obtainable under the trade name SIMATIC from Siemens Aktiengesellschaft, Erlangen, Germany (West), or from Siemens Corporation, Iselin, N. J. Relative to these components, reference may be had also to the book by H. W. Gschwind "Design of Digital Computers," published 1967 by Springer-Verlag, Vienna and New York (pages 105–107, 115–123, 134–147, 155–159, 244–247).

In the foregoing explanation it is tacitly assumed that the travel to be subdivided is parallel to the X-axis of the machine. If the travel $s$ extends at an angle to the X-direction, then analogously the value $s$ cosine of the angle is to be taken into consideration.

Furthermore, while in the foregoing the step length represented by a number of pulses is understood to be a distance, it is preferable, when machining curved rather than straight contours, for example circles, and operating at constant travel speed to subdivide the travel, not into step distances $\Delta s$ but into incremental lengths of time $\Delta t$ needed by the transducer or interpolator to traverse the step length $\Delta s$. By anticipatory interpolation, it can be ascertained how often the distance $\Delta s$ is traversed per length of time in the programmed section of tool feed. This results in determining the remainder of time which constitutes an equivalent of the above-discussed travel remainder R. The time intervals $\Delta t$ (=$\Delta s$) are now reduced by $\nu$ until the remainder R corresponds to a corresponding portion of $\Delta t$ constituting a permissible minimal feed stroke. In other words, the term "step length" as set forth in the claims annexed hereto may either constitute a length in terms of distance or a length in terms of time.

Upon a study of this disclosure it will be obvious to those skilled in the art that our invention permits of various modifications and may be given embodiments other than particularly illustrated and described herein, without departing from the essential features of our invention and within the scope of the claims annexed hereto.

We claim:

1. The method of digitally subdividing the tool feed travel of a nibble machine or other machine tool into steps of approximately equal lengths, which comprises sequentially adding after one of the first steps the length ($\Delta s$) of the respective next following steps to obtain each time the sum total ($n\Delta s$) of the number ($n$) of steps, comparing each of the sum totals with the then still remaining feed travel ($s-x$), and shortening the length of the subsequent steps by a given amount ($\nu$) until the difference between the still remaining feed travel ($s-x$) and the sum total ($n\Delta s$) declines below a given minimum ($d$) between 50 and 100 percent of the step length ($\Delta s$).

2. The machine-tool feed control method according to claim 1, wherein the length ($\Delta s$) of the first feed step is continually summed at the end of the respective next following steps.

3. The machine-tool feed control method according to claim 2, wherein said minimum is about 60 percent to about 70 percent of the step length ($\Delta s$).

* * * * *